United States Patent [19]

Charles

[11] Patent Number: 4,501,129
[45] Date of Patent: Feb. 26, 1985

[54] INTEGRAL ENGINE AIR CONDITIONING SYSTEM

[75] Inventor: Herbert N. Charles, Chatham, Canada

[73] Assignee: Canadian Fram Limited, Chatham, Canada

[21] Appl. No.: 460,229

[22] Filed: Jan. 24, 1983

[51] Int. Cl.³ .............................................. B60H 3/04
[52] U.S. Cl. ..................................... 62/239; 62/428; 180/68.4
[58] Field of Search ........................ 180/68 R, 54 A; 123/41.49, 41.65; 62/239, 428

[56] References Cited

U.S. PATENT DOCUMENTS

| | | |
|---|---|---|
| 3,129,753 | 4/1964 | Davis et al. ................... 62/428 X |
| 3,205,964 | 9/1965 | Henry-Biabaud ............ 180/68 R X |
| 3,606,762 | 9/1971 | Anglin et al. ..................... 62/239 X |
| 4,081,050 | 3/1978 | Hennessey et al. .......... 180/68 R X |
| 4,114,714 | 9/1978 | Fachbach et al. ............ 180/68 R X |
| 4,138,857 | 2/1979 | Dankowski ........................... 62/239 |
| 4,267,895 | 5/1981 | Eggert, Jr. ................... 180/68 R X |

FOREIGN PATENT DOCUMENTS

| | | |
|---|---|---|
| 739061 | 9/1943 | Fed. Rep. of Germany ... 180/54 A |
| 777559 | 6/1957 | United Kingdom ............... 180/68.1 |

Primary Examiner—William E. Tapolcai
Attorney, Agent, or Firm—Markell Seitzman; Russel Wells

[57] ABSTRACT

A cooling system for use with an engine and an associated engine driven flywheel. The system includes: centrifugal blower means fitted to and rotatable with the flywheel for developing a pressure differential thereacross; a housing enclosing said flywheel and said blower means for defining an air passage having a housing inlet for communicating air to said blower means and an output for permitting the discharge of air therethrough; air cooled heat exchange means connected to and positioned relative to the housing to permit air to flow therethrough by virtue of the operation of the blower means; damper means responsive to at least one engine operating parameter, for controlling the air flow through the heat exchange means; and compartment means for enclosing the blower means and housing and oriented to prohibit the entrance of ram air thereto and including inlet means for receiving non-ram air. Air conditioning condensers are positioned in communication with the compartment means and inlet means and cooled by the induced air provided by the operation of the blower means.

2 Claims, 5 Drawing Figures

INTEGRAL ENGINE AIR CONDITIONING SYSTEM

BACKGROUND AND SUMMARY OF THE INVENTION

This invention relates generally to cooling systems and more specifically to a direct engine driven air conditioning system having a centrifugal blower attached to and driven by an engine flywheel for cooling non-ram an vehicle engines. Present cooling systems often utilize a direct driven cooling fan that is situated downstream of a heat exchanger or condenser. The heat exchanger is mounted to receive air forced therethrough (hereinafter "ram air") by the forward motion of the vehicle. Alternately, the system fan can be driven by an accessory drive belt system. Accessory drives are already extremely crowded and providing tandem drives for a suitable blower system is not facilitated due to the possibility of engine redesign. It is an object of the present invention to provide a system to cool the heat exchanger independent of whether or not the vehicle is moving. It is a further object of the present invention to provide a system that can cool a heat exchanger or condenser associated with the engine's air conditioning system in proportion to the power being developed by the engine. It is a further object to provide a cooling system that controllably provides air to the heat exchanger as a function of operating conditions.

As described more completely in the accompanying drawings the invention comprises a centrifugal blower attached to the flywheel driven by the engine. A housing is provided to enclose the blower. The housing defines a scroll having an inlet and a discharge, the inlet is positioned on a sloping face of the housing and flares to a rectangular opening to support a first heat exchanger or radiator. The inlet or alternately a discharge is provided with a controllable damper to regulate air flow through the blower and housing and hence through the radiator. The blower is an enclosed or partially enclosed compartment. It is contemplated that the discharge from the housing would pass through a lower portion of the compartment. Air for cooling the heat exchanger is received from air inlets. These inlets may be located in the walls of the compartment or remote therefrom with appropriate ducting provided. Alternately, the heat exchanger or condenser may be lodged within the ducts. The present cooling system is primarily designed to operate with non-ram air vehicles, that is, that class of vehicles which does not require vehicle motion to provide cooling air to the heat exchanger. However, the invention can be employed with ram air vehicles as well. Since ram-air is no longer depended upon for cooling, an advantage of the present invention is that the engine can be located in a confined compartment within the vehicle thus providing a controllable engine environment. In addition the invention permits the frontal area of the vehicle to be streamlined thus reducing the drag.

These and other objects, features and advantages of the present invention would become more apparent from following the specification accompanying the drawings.

BRIEF DESCRIPTION OF THE DRAWINGS

In the drawings:

FIG. 4 schematically illustrates an alternate embodiment of the invention.

DETAILED DESCRIPTION OF THE DRAWINGS

Figure 1:
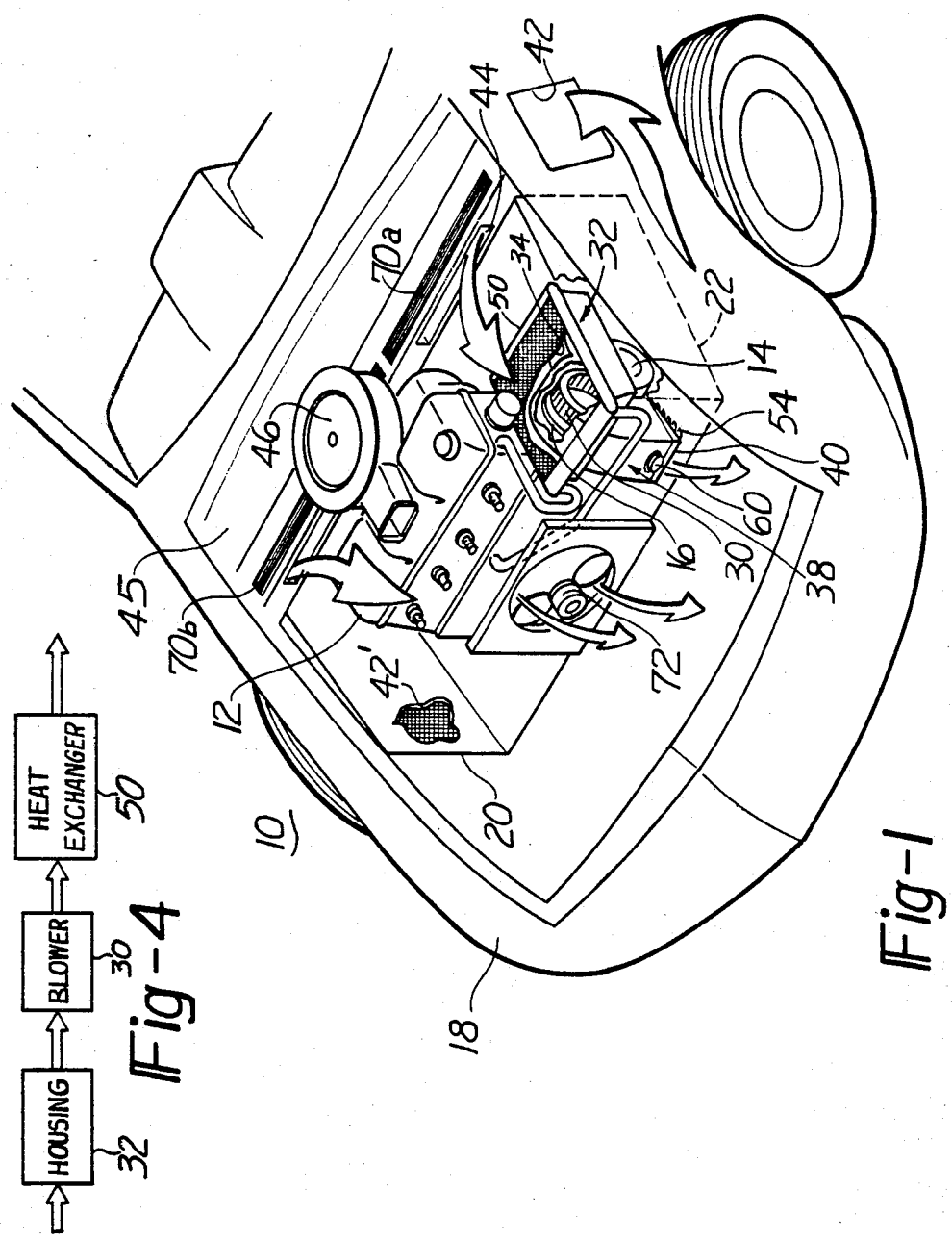
FIG. 1 is an orthogonal view showing the present invention driven by a transversely mounted engine within an enclosed engine compartment of a vehicle.

Reference is now made to FIG. 1 which illustrates a cooling system 10 for an engine 12. The engine is adapted to drive a transmission 14 having associated therewith a flywheel 16 as more particularly illustrated in FIGS. 2 and 3. The engine 12 and transmission 14 as illustrated are transversely mounted relative to the vehicle body 18, however, other mounting relationships are applicable. The engine is lodged within a confined or enclosed engine compartment 20. The engine compartment 20 may be formed by the hood, fender panels or liners and belly pan 22 or by a separate enclosed compartment. However, it is not a requirement of the invention that the compartment be sealed. In addition, while it may be desirable to fully enclose the engine 12 in an engine compartment 20 this is also not a requirement of the present invention. The engine compartment may be enclosed or partially enclosed to prohibit ram air from being transmitted therein. The cooling system 10 further includes a centrifugal blower 30 fitted to and rotatable with the flywheel 16. A housing 32 is provided to enclose the flywheel 16 and blower 30. The housing 32 defines an air passage 34 within which the blower 30 rotates and is provided with an inlet 36 and a scroll 38. The scroll 38 terminates in an outlet 40 for directing the discharge from the blower. As illustrated in the accompanying drawings the outlet 40 or discharge from the scroll is directed through the belly pan 22 of the engine compartment 20. In addition, to avoid the re-entry of hot air discharged from the scroll 38 a downwardly and rearwardly oriented discharge is desirable. A partial or full belly pan 22 is seen as an excellent way of avoiding recirculation of hot air and further ensures that the cooling air will generally enter the engine compartment 20 through opening 42 or 42'. The belly pan 22 is not shown in FIGS. 2 and 3.

Figure 2:
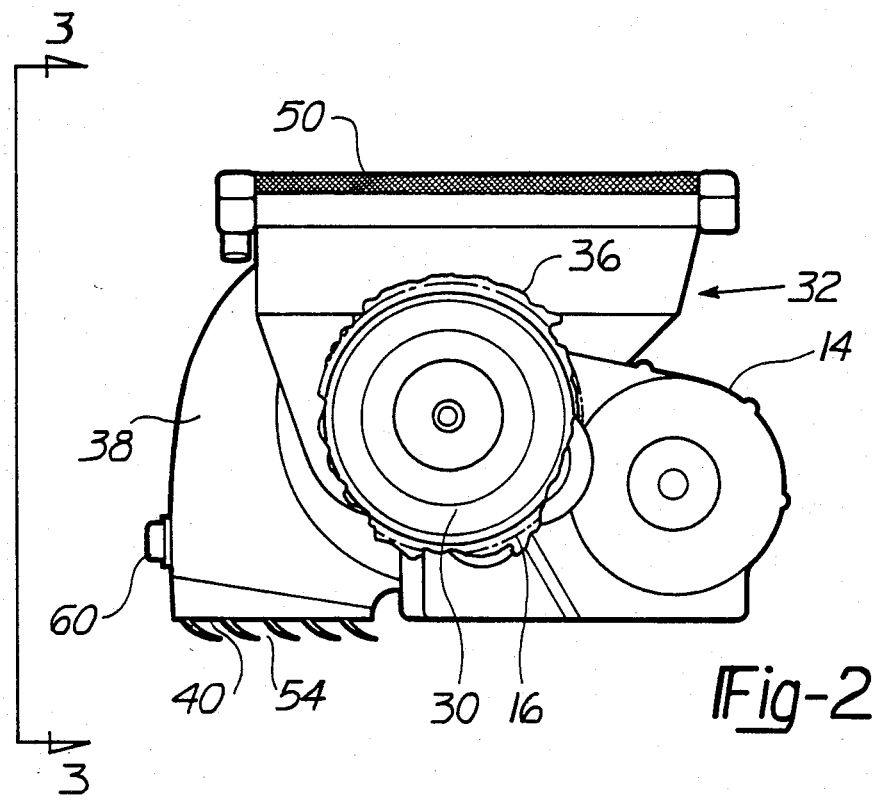
FIG. 2 is a plan view of the engine of FIG. 1.
Figure 3:
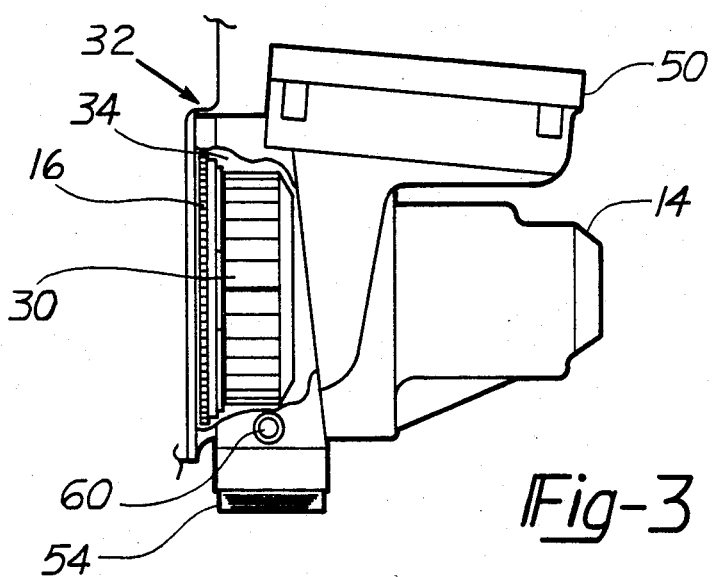
FIG. 3 is a front plan view taken in the direction of the section lines 3—3 shown in FIG. 2.

A heat exchanger or radiator 50 is connected to the inlet 36 of the housing as shown in FIGS. 1-3. A damper 54 is preferably located in the outlet passage 40 of the housing to control the quantity of air permitted to flow through the heat exchanger or radiator 50. The damper 54 can alternately be placed upstream in communication with the inlet 36 of the housing 32. The damper may be controlled, in a known manner, by a vacuum or electric positioning device 60 that may be responsive to engine vacuum, temperature or power. Alternatively, the heat exchanger 50 may be positioned downstream of the blower 30 as schematically illustrated in FIG. 4. In this embodiment of the invention cooling air is blown through the exchanger 50 rather than drawn through as discussed above. It is contemplated that air would be drawn through a screened opening 36 in the housing 32 and discharged into the plenum of the heat exchanger through suitable ducting.

It can be appreciated that the heat exchanger 50 need not be located proximate to the housing 32 but may be located any place on the vehicle. As an example the heat exchanger could be located remote from the compartment 20 behind the cab of a highway tractor (not shown).

In general, air is supplied from openings 42 in either of the side panels of the vehicle which communicate through the input duct 44 to the engine compartment 22 or directly through an opening 42' in the engine compartment. The input duct 44 may be a part of the cowl 45. The supplied air is available to the radiator 50 and carburetion device 46. Alternatively additional ducting can be used to separately communicate the supplied air from an inlet 42 (or 42') directly to either the radiator 50 or the carburetion device 46.

The cooling system 10 may also include, juxtaposed with the engine compartment 20, a second heat exchanger or condenser 70 adapted to connect, in a known manner, with other components of an air conditioning system. The air flow through the ducts 44 of the cowl 45 may be used for cooling of air conditioning condensors 70a and b. The air conditioning system would include an engine driven compressor, evaporator, sensors, switches, and condensors of a known kind. It is envisioned that two condensors 70a and b can be utilized. The air conditioning condensors 70, hereinafter referred to as split condensors 70a and b, are situated in the air ducts 44. An auxiliary electric fan 72 may be used to supplement the blower 30 to provide additional air flow through the ducts 44. Fan 72 is mounted to compartment 22 in a manner such that ram air is not permitted to flow thereacross. It should be appreciated that the fan 72 is not a requirement of the invention.

Figure 5:
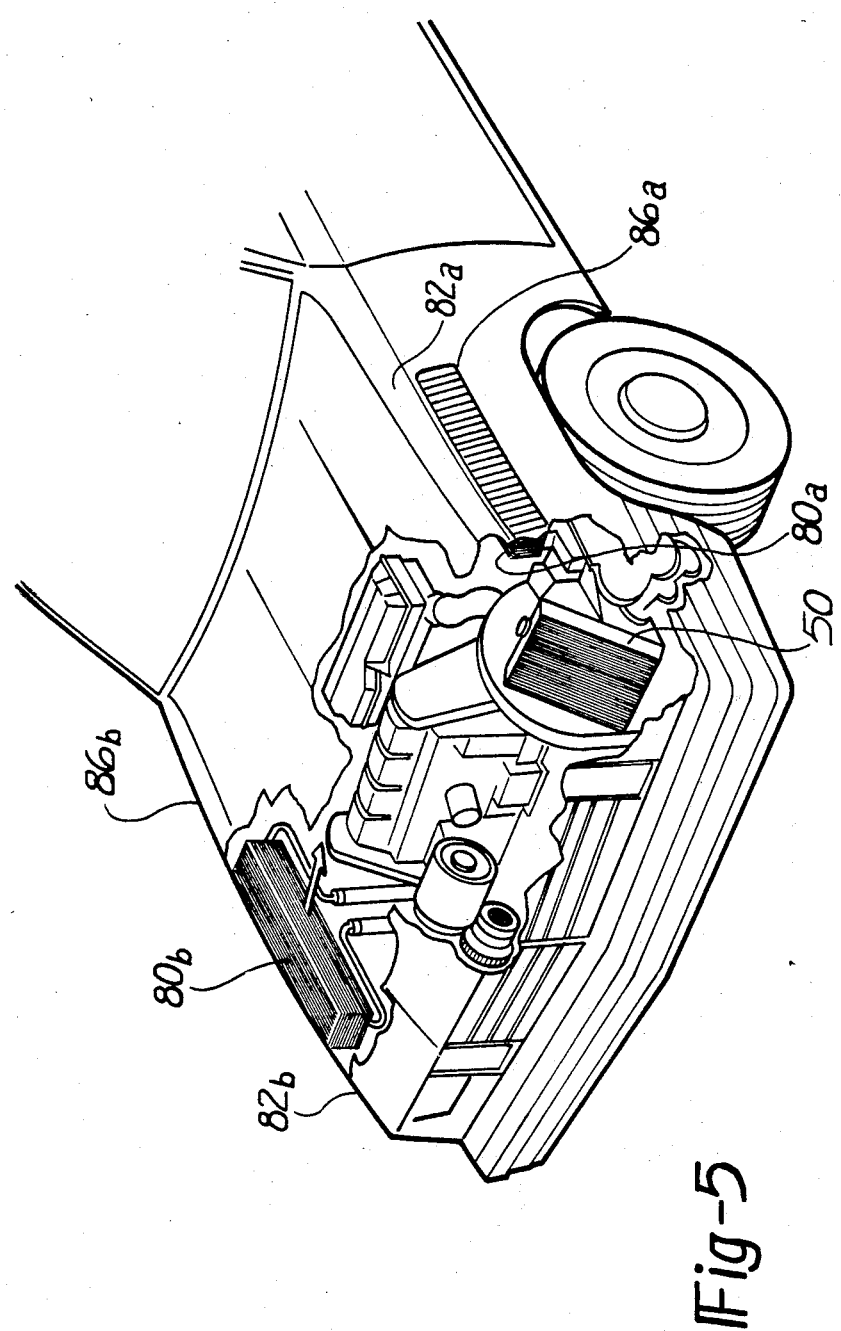
FIG. 5 illustrates another embodiment of the invention.

Reference is now made to FIG. 5 which illustrates an alternate embodiment of the invention. There is shown a pair of condensors 80a and b mounted between the outer fenders 82a, b and the inner fender liners (not shown). The condensers 80a and b receive non-ram air from louvers 86a and b positioned in the outer fenders 82 to receive non-ram air. The downstream side of the condensers 80 communicate air to the enclosed engine compartment 20 and thereafter to the radiator 50 and carburetion device 46.

The operation of the system is explained below.

Air is drawn through the openings 42 or louvers 86 by the operation of blower 30. The engine driven blower 30 draws or blows the air within the engine compartment through the heat exchanger 50 as long as the damper 54 is open. If the vehicle contains the air conditioning condensers 70a and b or 80a and b they are similarly exposed to and cooled by the blower created air flow. It is envisioned that during engine warm-up from a cold-start condition the damper 54 will be closed thereby providing rapid engine warm-up by virtue of the enclosed environment afforded by the engine compartment. When cooling is necessary under operating conditions such as full throttle or under hot engine conditions or when the air conditioning system is required to be on, the damper 54 is opened by the motor 60 in a conventional manner in response to engine or air conditioning parameters to permit the flow-through of air thus cooling the fluid within the heat exchanger 50 and condensers (70, 80). In addition, under operating conditions characterized by light engine load, the blower 30 may be shut or dampered completely or partially off to reduce the power that would otherwise be consumed as compared to conventional cooling systems having a rotating blower or fan mechanism thus improving the overall efficiency of the system.

Many changes and modifications in the above described embodiment of the invention can of course be carried out without parting from the scope thereof. Accordingly that scope is intended to be limited only by the scope of the appended claims.

I claim:

1. An air conditioning system for cooling an internal compartment of a vehicle having an engine forwardly mounted relative to the internal compartment including an engine driven compressor, an evaporator communicated with the internal compartment, at least one condenser connected in circuit with the compressor and evaporator, comprising:

compartment means for providing an enclosed volume formed by a hood, inner fender liners, vehicle firewall and belly pan linking same;

air inlet means situated on the vehicle and positioned on a portion of the vehicle forward of the internal compartment that does not receive ram air, and for communicating the non-ram air to the compartment means, and wherein at least one condenser is situated relative to said air inlet means to receive the non-ram air prior to communication to said compartment means;

blower means driven by the vehicle's engine and having an inlet positioned within said compartment means and an outlet adapted to discharge air out from said compartment means;

damper means responsive to at least one air conditioning parameter, mounted in series with said blower, for controlling the air flow therethrough and an auxiliary fan positioned at the perimeter of said compartment means, responsive to control signals input thereto for withdrawing air from said compartment means and for increasing the air flow across said condensers.

2. An air conditioning system for cooling an internal compartment of a vehicle having an engine forwardly mounted relative to the internal compartment including an engine driven compressor, an evaporator communicated with the internal compartment, at least one condenser connected in circuit with the compressor and evaporator, comprising:

compartment means for providing an enclosed volume formed by a hood, inner fender liners, vehicle firewall and belly pan linking same;

air inlet means situated on the vehicle and positioned on a portion of the vehicle forward of the internal compartment that does not receive ram air, and for communicating the non-ram air to the compartment means, and wherein at least one condenser is situated relative to said air inlet means to receive the non-ram air prior to communication to said compartment means wherein said inlet means comprises an opening in a side panel forward of said internal compartment of the vehicle, duct means located proximate a cowl disposed on the upper body of the vehicle communicating said opening with said compartment means and wherein said at least one condenser is lodged in communication with the air flowing in said duct means;

blower means driven by the vehicle's engine and having an inlet positioned within said compartment means and an outlet adapted to discharge air out from said compartment means;

damper means responsive to at least one air conditioning parameter, mounted in series with said blower, for controlling the air flow therethrough and an auxiliary fan positioned at said compartment means, responsive to control signals input thereto for withdrawing air from said compartment means.

* * * * *